T. E. MURRAY, Jr.
APPARATUS FOR ELECTRICALLY MAKING CUP-SHAPED PROJECTIONS IN METAL PLATES.
APPLICATION FILED MAY 5, 1917.
1,242,580.
Patented Oct. 9, 1917
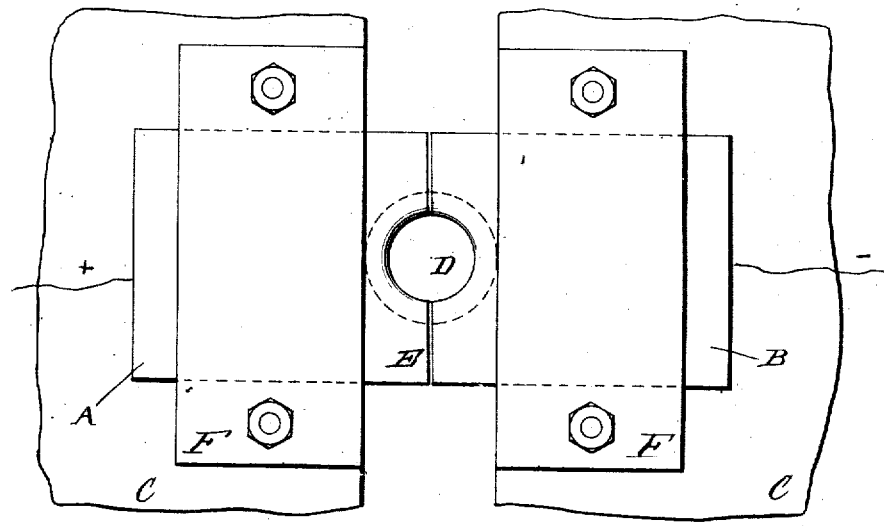
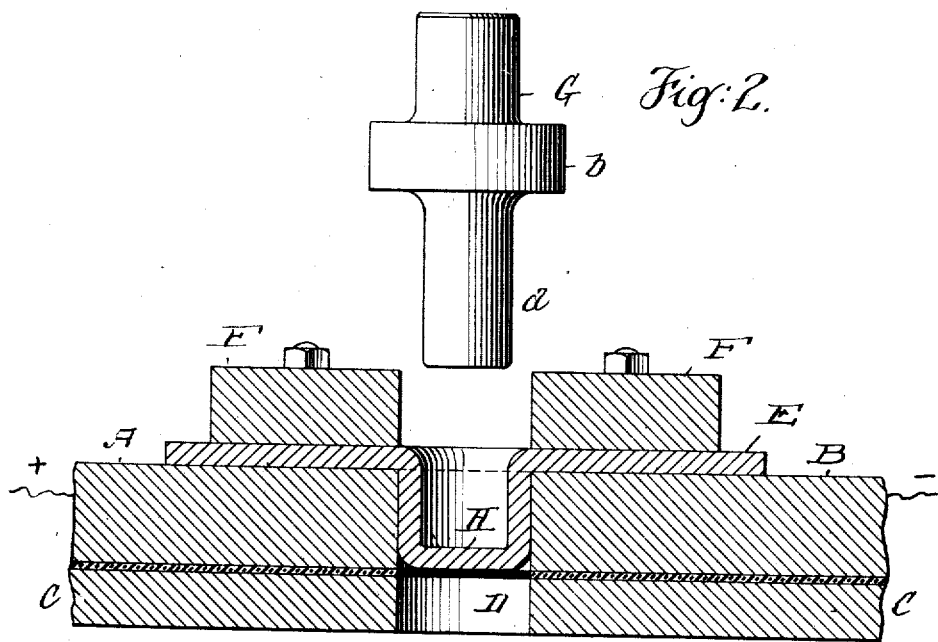

UNITED STATES PATENT OFFICE.

THOMAS E. MURRAY, JR., OF BROOKLYN, NEW YORK.

APPARATUS FOR ELECTRICALLY MAKING CUP-SHAPED PROJECTIONS IN METAL PLATES.

1,242,580.   Specification of Letters Patent.   Patented Oct. 9, 1917.

Application filed May 5, 1917. Serial No. 166,562.

*To all whom it may concern:*

Be it known that I, THOMAS E. MURRAY, Jr., a citizen of the United States, residing at Brooklyn, in the county of Kings and State of New York, have invented a certain new and useful Improvement in Apparatus for Electrically Making Cup-Shaped Projections in Metal Plates, of which the following is a specification.

The invention is an apparatus for electrically making cup-shaped projections in metal plates.

In the accompanying drawings—

Figure 1 is a plan view of the electrodes, the object in which the cup-shaped projection is to be formed, and the clamps for said object. Fig. 2 is a vertical section showing the vertically movable former in elevation and in raised position.

Similar letters of reference indicate like parts.

A and B are separated electrodes resting upon any suitable supports C, from which they are insulated. An opening D, here circular in cross section, is formed by oppositely placed semi-circular recesses in the opposing faces of said electrodes and supports. A metal plate E, in which the cup-shaped projection is to be formed, is placed upon the electrodes A, B to cover the opening D, and is secured by clamping bars F and bolts, which bars are in electrical contact with said electrodes.

The former G is supported above the plate E in any suitable manner for vertical motion. The lower portion $a$ of said former is to be of a predetermined diameter, corresponding to the internal diameter of the desired cup. In order to determine the depth of the projection or cup, a collar $b$ of diameter greater than that of the part $a$ is preferably made integral with the former G, and at a selected distance from the lower end of said former.

The operation is as follows:

The plate E being clamped in position on the electrodes A, B, a current is established of sufficient strength to heat and so soften the portion of said plate which covers said opening D. The former G is then caused to descend, and so to force said softened metal into said opening D, until the collar $b$ meets the clamps F, and so acts as a stop to prevent further descent of said former. In this way, the cup-shaped projection H is produced, and at the same time molded at its periphery between said former and said electrodes. When the collar $b$ meets the clamps F, the current is short-circuited through the former, so that its heating effect upon the metal of the projection H then substantially ceases, thus permitting the said metal quickly to solidify, and preventing any downward flow of the metal by gravity after the determined depth of the cup has been attained. The former is then withdrawn from the completed cup.

The cavity, cup or recess thus produced in one side of the plate E may serve as a step to receive a shaft or rod, or any other desired purpose: or the hollow closed projection appearing on the opposite side of said plate D may serve as a lug or stop. The former and the opening D instead of being circular may be made of any desired cross section, as, for instance, rectangular.

I claim:

An apparatus for electrically making an integral cup-shaped projection on a metal plate, comprising two separated electrodes having in their opposing faces registering transverse recesses, a longitudinally moving former adapted to enter the opening formed by said recesses for a predetermined distance to mold said projection in said opening, and means for short-circuiting the heating current, automatically operating upon the entrance of said former into said opening for a certain predetermined distance.

In testimony whereof I have affixed my signature in presence of two witnesses.

THOMAS E. MURRAY, JR.

Witnesses:
  GERTRUDE T. PORTER,
  MAY T. McLARRY.